UNITED STATES PATENT OFFICE.

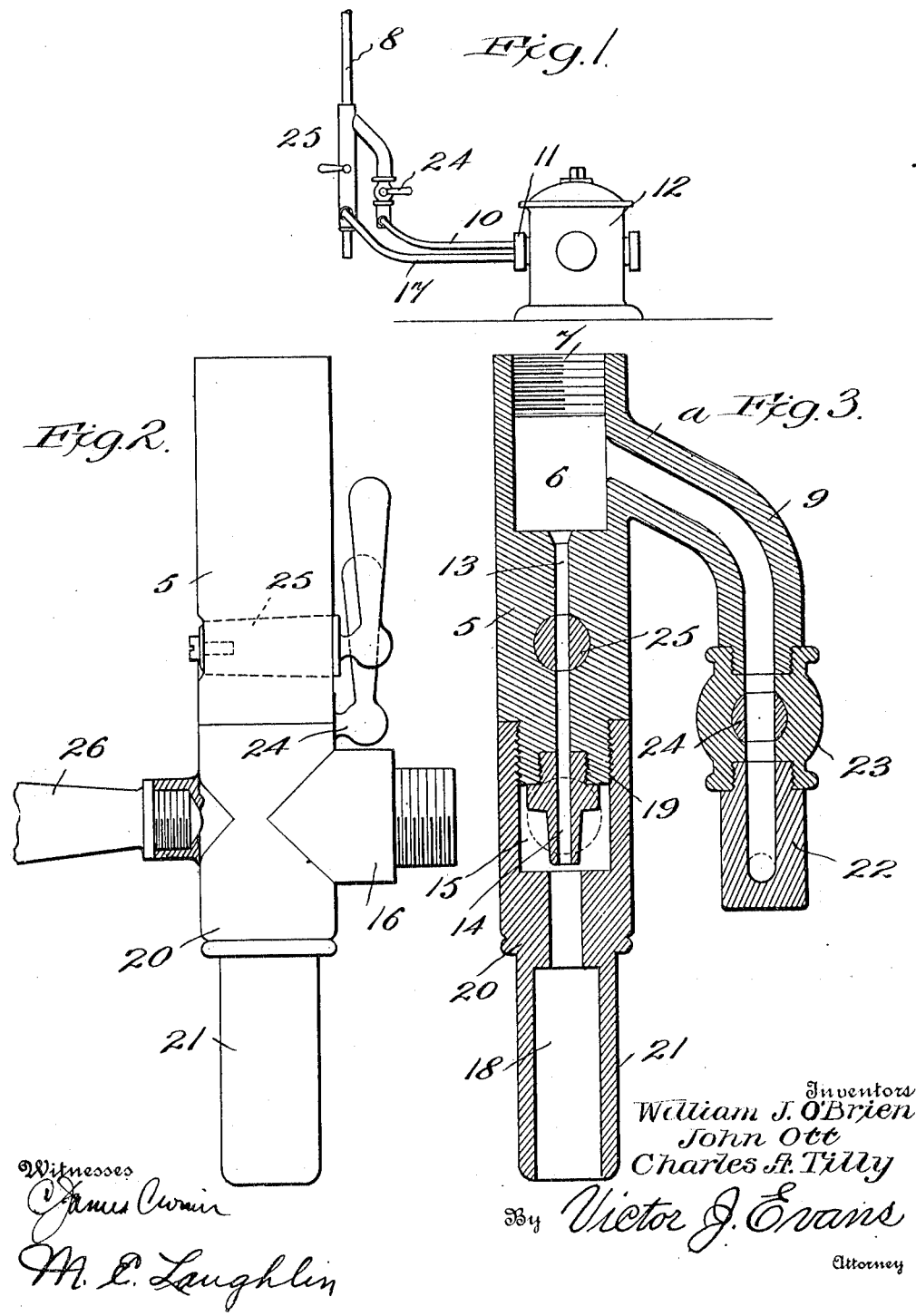

WILLIAM J. O'BRIEN, JOHN OTT, AND CHARLES A. TILLY, OF BROOKLYN, NEW YORK.

THAWING AND DRAINING DEVICE.

1,118,793.  Specification of Letters Patent.  Patented Nov. 24, 1914.

Application filed January 8, 1913. Serial No. 740,854.

*To all whom it may concern:*

Be it known that we, WILLIAM J. O'BRIEN, JOHN OTT, and CHARLES A. TILLY, citizens of the United States, residing at Brooklyn, in the county of Kings and State of New York, have invented new and useful Improvements in Thawing and Draining Devices, of which the following is a specification.

The general object of the invention is to admit of the introduction of a thawing agent such as the live steam frozen valve of a fire hydrant, and to effect the drawing off of the liquid as the steam condenses and the liquid resulting from the thawing of the ice.

Another object is to admit of readily drawing off the water left between the valve and the nozzle of a hydrant after the closing of the said valve. And to this end the invention resides in a portable fitting adapted at one end for connection to a suitable source of steam supply such as the boiler of a fire engine, and constructed for connection to the hydrant from two different points and to direct the major portion of the steam which it receives by one of said points into the hydrant and to utilize the remaining steam for creating a vacuum through its second point of connection with the hydrant.

Other objects will appear and be better understood from that embodiment of my invention of which the following is a specification, reference being had to the accompanying drawings forming part hereof, in which:—

Figure 1 is a diagrammatic view of the invention in use. Fig. 2 is a detail side elevation of the fitting partly in section. Fig. 3 is a detail longitudinal section looking at right angles to Fig. 2.

The body of the fitting herein designated generally by *a*, may be formed of any material found suitable for the purpose, as metal, and its size and the general contour and disposition of its several parts, will, of course, be governed by the character of the work in connection with which it is to be used.

In the embodiment shown which is the simplest form of the fitting, the part 5 of the body *a* is bored longitudinally in one end to provide a chamber 6 a portion of whose wall is screw threaded as indicated at 7 and is of such size as to receive an ordinary hose coupling carried by a hose 8 which hose connects to a suitable source of fluid, such as the boiler of a fire engine. A by-pass tube 9 is offset from the portion 5 and suitably connected to the said portion and has one end communicating with the chamber 6. The free end portion of this tube is adapted for connection to the coupling of a hose pipe 10 which, when the device is in use for thawing a frozen valve, is directed into the nozzle 11 and down through the hydrant 12 and into contact with the portion of the interior to be thawed. The chamber 6 is in axial alinement with an open-ended choked bore or passage 13 in the part 5 and arranged in the end of the said choked bore or passage 13 remote from the chamber 6, is a nozzle 14 which is arranged in a vacuum chamber 15. A laterally disposed screw threaded nipple 16 communicates with the chamber 15 and is adapted for connection to a hose pipe 17 which, when the device is in use as a thaw or siphon, is directed into the nozzle 11 and down through the hydrant 12 and into contact with the ice or into the column of water between the nozzle and the valve, as the case may be. The nozzle 14 is in axial alinement with an outlet passage 18 which communicates with the chamber 15 and forms an outlet for the fluid from the passage 13 and the matter entering the chamber 15 through the pipe 17.

In constructing the embodiment shown and just described the part 5 is reduced at one end as indicated at 19 and screw threaded for connection with a tubular sleeve or nozzle 20 in which the chamber 15 is formed and whose free end portion is reduced as indicated at 21, for connection to a suitable rubber tube or pipe which may, if desired, be employed for directing the matter entering the chamber 15 into a gutter or into a suitable receptacle. And in this connection the by-pass tube 9 is formed in three sections the outer 22 of which has the nipple for connection to the hose pipe 10 and the intermediate section 23 is in the form of a valve casing having a valve 24, this intermediate casing being connected to the inner section of the by-pass tube, and the valve being employed for controlling passage through the tube.

When used as a means for effecting the thawing of a hydrant the hose pipe 8 is connected to a steam boiler as hereinbefore mentioned and to the fitting as indicated in Fig. 1. The pipes 10 and 17 are then passed through the nozzle 11 and into the hydrant 12. The valve 24 is then opened as shown in Fig. 2 and so too is the valve 25 located in the part 5 and arranged to control passage through the bore 13. Now if desired the fitting may be placed on the ground or held by the handle 26. Now upon the steam entering the chamber 6 the greater part of the volume of steam will pass through the hose pipe 10 and into the hydrant, while the lesser part will pass through the passage 13, nozzle 15 and passage 18. Now the live steam impinging on the ice in the hydrant will as usual effect the melting of the ice and the steam issuing from the nozzle 14 and moving through the passage 18 will create a partial vacuum in the pipe 17 so that the liquid in the hydrant will rise through the pipe 17 and into the chamber 15 from whence it will be drawn through the passage 18 by the steam issuing from the nozzle 14.

Where it is desired to drain a hydrant such as is necessary after the closing of the hydrant valve, the valve 24 is closed and in this connection the hose pipe 10 may be disconnected from the by-pass tube 9. The hose pipe 17 is now directed into the nozzle 11 and into the column of water above the valve after which with the pipe 8 connected to a suitable source of fluid supply, the valve 25 is opened, whereupon the action of the fluid issuing from the nozzle 14 will have the effect of creating a partial vacuum in the pipe 17, whereupon the water in the hydrant will rise through the pipe 17 and be expelled through the passage 18 by the action of the steam.

What is claimed as new is:

A thawing device comprising a body provided at one end with a chamber of relatively great transverse sectional area, said body having a bore passing through the same and communicating at one end with the chamber, said bore being of less transverse sectional area than the chamber, a nozzle provided upon the body at the end thereof opposite the end at which the chamber is located, said nozzle having a longitudinal bore in alinement with the bore in the body and of the same transverse area, a valve mounted upon the body and arranged to operate across the bore thereof, said body having at its side a by pass tube the passageway through which communicates with the chamber, and which is of less transverse sectional area than the chamber but of greater transverse sectional area than the bore, a valve for controlling the passageway through the tube, and a sleeve connected with the body and inclosing the nozzle and having a nipple located adjacent the side of the nozzle and between the ends of the nozzle, said sleeve having a passageway through the same which is in longitudinal alinement with the bore of the nozzle.

In testimony whereof we affix our signatures in presence of two witnesses.

WILLIAM J. O'BRIEN.
JOHN OTT.
CHARLES A. TILLY.

Witnesses:
JOHN A. DONEGAN,
GEO. A. BYRNE.

Copies of this patent may be obtained for five cents each, by addressing the "Commissioner of Patents, Washington, D. C."